Oct. 20, 1925.  
S. CORYELL  
PISTON  
Filed Oct. 29, 1923

1,557,987

INVENTOR,  
Stanley Coryell,  
BY  
ATTORNEYS.

Patented Oct. 20, 1925.

1,557,987

UNITED STATES PATENT OFFICE.

STANLEY CORYELL, OF OXNARD, CALIFORNIA.

PISTON.

Application filed October 29, 1923. Serial No. 671,420.

*To all whom it may concern:*

Be it known that I, STANLEY CORYELL, a citizen of the United States, residing at Oxnard, in the county of Ventura and State of California, have invented new and useful Improvements in Pistons, of which the following is a specification.

This invention relates to pistons, and such pistons as are used in reciprocating engines, whether of the internal combustion type, commonly using gasoline, coal oil or other combustible fluid within a cylinder member adapted to actuate a piston, or in turbines, whether using gasoline or other combustible fluid, steam or otherwise, or of the ordinary reciprocating piston in a steam cylinder.

The invention has for an object the provision of a novel form of piston adapted to relieve shock incident to a propelling force such as explosive or impact pressure exerted against the head of such piston. A further object is the provision of a piston so constructed that vibration of moving parts actuated by movement of the piston is reduced to a minimum.

It is a known fact that the average combustion motor such as the gasoline engine now generally incorporated in motor vehicles causes excessive vibration of the moving parts incident to explosions within a cylinder or cylinders. Numerous companies supplying gasoline or other combustible fluid advertise nondetonating fluid, meaning that they have produced a combustible fluid which eliminates to a certain degree the sledge hammer effect on a piston head. Obviously a heavy explosion occurring between the cylinder head and the piston head drives the piston downwardly within the cylinder with a violent force and this causes a jar on the crank shaft. It is true that in the six-cylinder internal combustion engine this jar is to an extent eliminated, but it must be remembered that in the average six-cylinder engine only two cylinders are being fired at a time and that there is a very small overlap in the power stroke. This means that two of the other four cylinders are prepared for an intake of fluid or gas to be compressed prior to an explosion thereof while the other two cylinders are ejecting burnt gas therefrom. Regardless of the off-set portions of the crank shaft and the positions of the piston rods associated with such off-set portions and the piston heads, there is considerable vibration due to a turning of the crank shaft by the piston rods during the power strokes, a rapid wearing of the crank shaft bearings, and a general vibration or tremor to the entire motor vehicle when the engine is idling with the car standing still or when the engine is turning over at high speed with the car running. With my invention I am able to relieve to an appreciable extent the primary shock incident to an explosion within an engine cylinder so that the loosening and rapid wearing of crank shaft bearings are reduced, as well as vibration and comfort and flexibility of control is produced.

With the above and other objects in view, the invention consists in the novel and useful provision, formation, construction, association and relative arrangement of parts, members and features, all as shown in one embodiment of the accompanying drawing, described generally, and finally pointed out in claims.

In the drawing.

Corresponding parts in all the figures are designated by the same reference characters.

Figure 1:
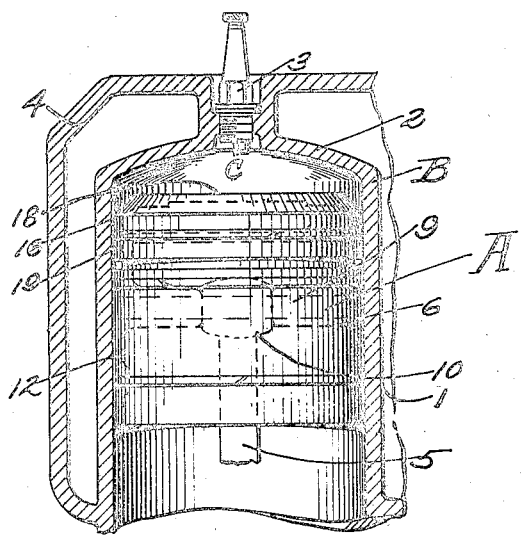
Figure 1 is a fragmentary vertical sectional view of a cylinder having a piston therein incorporating the improved invention.
Figure 3:
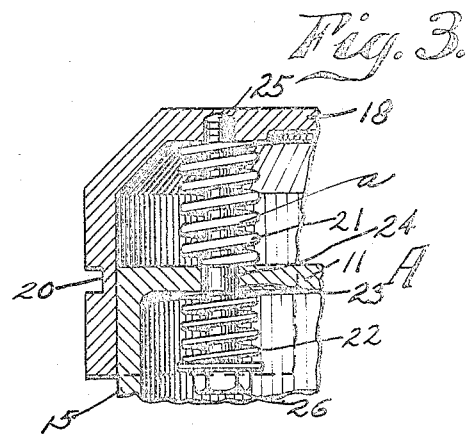
Figure 3 is a fragmentary vertical sectional view on an enlarged scale, of certain details of construction of the invention; and, Figure 4 is a fragmentary cross sectional view on the line 4—4 of Figure 2, and looking in the direction of the appended arrows.
Figure 2:
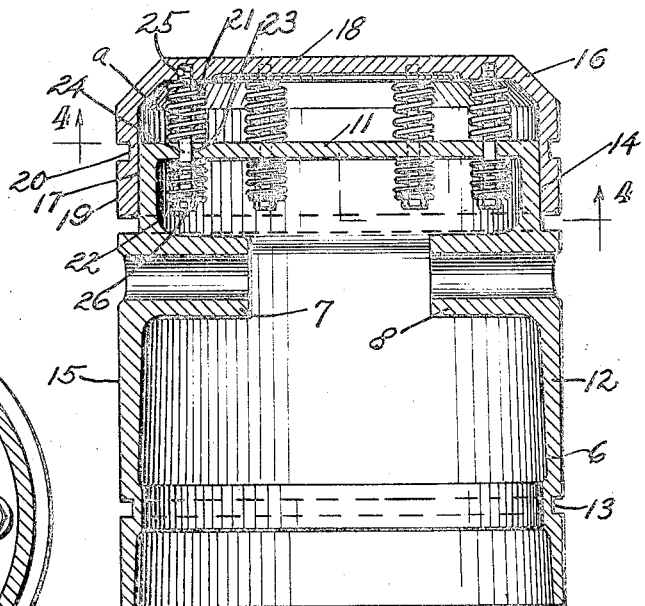
Figure 2 is an enlarged vertical sectional view of a piston head incorporating the invention.

Referring with particularity to the drawing, the improved piston is designated as an entirety by A, and a cylinder member with which said piston may cooperate by B, which cylinder B is conventional, including the usual cylinder walls 1 having a cylinder head 2 formed to receive a spark plug 3, with a water jacket 4 or other cooling system surrounding the cylinder walls 1. Within such cylinder in the embodiment shown is the piston A, the same including the rod 5 and head 6. The head 6 may be annular in form, as shown in Figure 2 and provided with transverse aligned bearing members 7 and 8 adapted to accommodate a pin 9, which pin is associated with a bearing member 10 on the piston rod 5. This allows the rod to move relative to the piston during a stroke of the piston head within the cylinder. As is usual the piston head has the end wall 11 associated with the annular wall 12 of the head 6. The wall 12 is likewise provided with a peripheral groove 13 adapted to receive a piston ring, as is usual practice. The annular wall 12 is reduced as shown at 14, that is to say, the diameter thereof is less than the portion shown at 15, and a cap 16 is adapted to be accommodated upon the portion 14 of the wall 12. This cap includes an annular wall portion, 17 having an end wall 18 joined with the annular wall 17, and such annular wall 17 has its outer surface as 19 substantially in alignment with the outer surface 15 of the portion 12 of the cylinder head 6. The cap 16 may be provided with a peripheral groove 20 adapted to receive the usual piston ring. It will thus be seen that the cap is in slidable engagement with the portion 14 of the head 6. The cap is in flexible or resilient association with the piston head 6 by means *a*, which means *a* includes spring members 21 and 22 mounted on opposite sides of the end wall 11, which end wall 11 is formed with a transverse perforation or series of perforations 23, and a pin or bolt 24 is passed through such transverse perforation 23 and has a screw-threaded engagement at one end, as shown at 25 with the end 18 of the cap. The opposite end of such bolt or pin carries a nut 26. The spring 21 is interposed between the wall 11 and the end 18 of the cap, while the spring 22 is interposed between the nut 26 and the wall 11. It will thus be seen that the springs tend to maintain a balance; in other words, the spring 21 would normally lift the cap so as to space the same at a distance greater than that shown in Figure 2 from the wall 11, and this movement is opposed by the spring 22.

Figure 4:
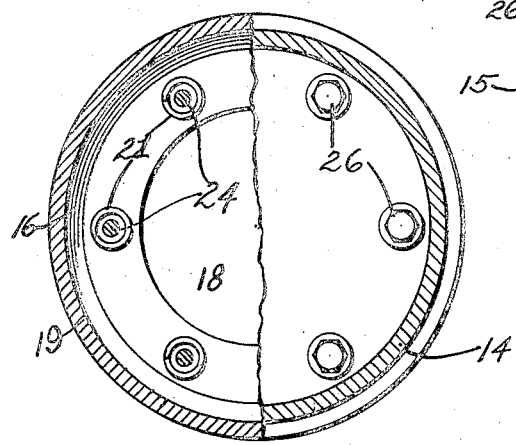

As stated, I may provide a plurality of such springs and pins or bolts, as shown in Figure 4, in which case I would equidistantly space the same.

In actual operation I incorporate the piston with its resiliently mounted cap within the cylinder, and when a charge of combustible fluid is received between the cap and the cylinder head as at C and such gas compressed and then fired by means of the spark plug 3 associated with suitable ignition apparatus, the cap is driven downwardly prior to the piston head proper commencing its movement. This driving of the cap tends to absorb through the medium of the resilient members, *a*, a portion of the shock incident to such explosion, and thus eases the effect of the violent jar or blow exerted on the piston rod 5 associated with the crank shaft. Immediately after the explosion the spring members 21 and 22 tend to equalize themselves and during the exhaust and compressing strokes the cap, due to its elastic or resilient mounting, cushions the effect of movement of such piston head. An efficient circulation of water within the jacket 4 will prevent the springs from becoming distempered, due to heat within the cylinder, and within the scope of my invention the end 18 might be hollowed to form a vacuum chamber so as to resist the invasion of heat between the cap and the cylinder head proper. I also within the scope of my invention may substitute pneumatic means in place of the spring members, such pneumatic means comprising two small pistons in opposed relation within a short cylinder or cylinders, the compression of the air within such cylinders acting as a cushioning means in the well understood manner. This latter principle is extensively used in shock absorbers of the pneumatic type.

It is obvious that various changes and modifications may be made in practicing the invention, in departure from the foregoing description, and showing of the drawing, without departing from the true spirit of the invention.

Having thus disclosed my invention, I claim and desire to secure by Letters Patent:

1. A piston head, including an annular wall formed with an annular reduced portion, said annular reduced portion being provided with an inwardly projecting flange, a cap member upon such annular reduced portion, said inwardly projecting flange being formed with a series of transversely spaced perforations, pin members associated with the cap and passed through such perforations, and independent spring members mounted on opposite sides of the inwardly projecting flange and surrounding such pin members, certain of such springs bearing against the cap member.

2. A piston head, including an annular wall provided with an inwardly projecting flange, and a series of spaced independent resilient members mounted on opposite sides of such inwardly projecting flange and effective thereon and a cap associated with said resilient members.

3. A piston head, including an annular wall formed with an inwardly projecting flange, resilient members mounted in opposed pairs on opposite sides of such flange and in spaced annular series, and a cap member carried on the annular wall for association with certain of the resilient members.

4. A piston head, including an annular wall formed with an inwardly projecting flange, resilient members mounted in opposed pairs on opposite sides of such flange and in spaced annular series, a cap member carried on the annular wall for association with certain of the resilient members, and a series of spaced guides between the inwardly projecting flange and the cap member.

5. A piston head, including an annular wall formed with an inwardly projecting flange, resilient members mounted in opposed pairs on opposite sides of such flange and in spaced annular series, a cap member carried on the annular wall for association with certain of the resilient members, and a series of spaced guides between the inwardly projecting flange and the cap member, said guides being associated with the resilient members.

6. A piston head including an annular wall formed with an inwardly projecting flange, resilient means on both sides of said flange, and effective thereupon, and a cap member associated with said resilient means.

In testimony whereof, I have signed my name to this specification.

STANLEY CORYELL.